United States Patent [19]

Okanoue

[11] Patent Number: 5,150,380
[45] Date of Patent: Sep. 22, 1992

[54] RECEIVER CAPABLE OF REMOVING BOTH INTERSYMBOL INTERFERENCE AND FREQUENCY OFFSET

[75] Inventor: Kazuhiro Okanoue, Tokyo, Japan
[73] Assignee: NEC Corporation, Tokyo, Japan
[21] Appl. No.: 597,693
[22] Filed: Oct. 17, 1990
[30] Foreign Application Priority Data
  Oct. 18, 1989 [JP] Japan .................................. 1-272006
[51] Int. Cl.$^5$ .................................................. H03H 7/30
[52] U.S. Cl. ........................................ 375/16; 375/12; 375/96; 375/101
[58] Field of Search ........................ 375/12, 14, 16, 96, 375/97, 101; 329/318; 364/424.2

[56] References Cited

U.S. PATENT DOCUMENTS

| | | | |
|---|---|---|---|
| 4,545,060 | 10/1985 | Arnon | 375/12 |
| 4,621,365 | 11/1986 | Chiu | 375/96 |
| 4,885,757 | 12/1989 | Provence | 375/96 |

OTHER PUBLICATIONS

Digital Communications, J. G. Proakis, New York:McGraw-Hill, 1983, Ch 6.
Performance Evaluation of a Mobile Satellite System Modem Using an ALE Method, T. Osawa et al., IMSC 90 Conf.
The Viterbi Algorithm Applied to Digital Data Transmission, J. F. Hayes, IEEE Communication Society, vol. 13, 2.
E. A. Lee et al., Digital Communication, Pub by Kluwer Academic Publishers, 1988.

*Primary Examiner*—Benedict V. Safourek
*Assistant Examiner*—T. Ghebretinsae
*Attorney, Agent, or Firm*—Whitham & Marhoefer

[57] ABSTRACT

In a receiver responsive to a reception signal subjected to an intersymbol interference and a frequency offset, the reception signal is delivered to a matched filter having a filter characteristic matched with a transmission path and filtered into a filter output signal accompanied by the frequency offset. The filter output signal is sent to a frequency offset estimation circuit to produce an estimation signal representative of an estimation value of the frequency offset. An equalizer is supplied with the estimation signal and a selected one of the reception signal and the filter output signal to equalize the frequency offset and the intersymbol interference.

5 Claims, 7 Drawing Sheets

RECEIVER CAPABLE OF REMOVING BOTH INTERSYMBOL INTERFERENCE AND FREQUENCY OFFSET

BACKGROUND OF THE INVENTION

This invention relates to a receiver for use in a digital communciation network to receive a digital signal which is supplied through a digital communication path.

When digital communication is made through such a digital communication path, a sequence of digital signals which is conveyed by a transmission carrier and which is transmitted as a modulated signal is often subjected to an intersymbol interference during transmission in the digital communication path, as is known in the art.

On the other hand, a receiver of the type described usually comprises a coherent detection circuit which carries out coherent detection to demodulate the digital signals by the use of a reproduced carrier derived from the modulated signal. On such coherent detection, the reproduced carrier is not always completely identical or coincident with the transmission carrier due to incompleteness of the coherent detection circuit. When non-coincidence takes place between the transmission carrier and the reproduced carrier, a frequency offset inevitably occurs in the receiver device and makes it difficult to accurately detect reception signal points and to demodulate the digital signals with a high reliability because the frequency offset brings about rotation of the reception signal points due to the frequency offset. In addition, such a frequency offset is varied in dependency upon the intersymbol interference. This shows that the intersymbol interference should be eliminated together with the frequency offset in order to realize digital signal transmission with a high quality.

Heretofore, a wide variety of methods have been proposed so as to avoid degradation of characteristics due to the intersymbol interference. For example, there are known a linear equalization method and a maximum likelihood sequence estimation (MLSE) method which is described by J. G. Proakis in "Digital Communications" New York: McGraw-Hill, 1983, Chapter 6. At any rate, the intersymbol interference is equalized in the above-mentioned methods by estimating an impulse response of a transmission path or communication path from a reception signal to produce an estimation result, by calculating, by the use of the estimation result, a mean square value of error signals between input and output signals of a detector, and by minimizing the mean square value. With such methods, it is possible to remove the intersymbol interference of the transmission path and to thereby avoid degradation of reception characteristics only when the impulse response is kept invariable during receiving the digital signals. However, when the frequency offset takes place in the receiver, phases of the reception signal points are rotated in dependency upon the frequency offset, namely, a difference between the transmission carrier and the reproduced carrier even when the intersymbol interference is eliminated due to the above-mentioned manner. Such phase rotation of the reception signal points may be considered as being equivalent to a variation of an impulse response of the transmission path.

Herein, a proposal has been offered about a method of estimating such a frequency offset to eliminate the same in a paper which is contributed by T. Osawa and M. Iwasaki, to IMSC 90 Conf. in Ottawa and which is titled "Performance Evaluation of a Mobile Satellite System Modem using an ALE Method". With this method, the frequency offset is estimated after a reception signal is frequency multiplied to remove a modulated component. According to this method, it is not so difficult to estimate the frequency offset when no intersymbol interference takes place. However, such a frequency offset can not be precisely estimated on occurrence of any intersymbol interference.

Under the circumstances, it is difficult to realize digital signal transmission with a high quality by both the conventional techniques of removing the frequency offset and intersymbol interference when both the intersymbol interference and the frequency offset concurrently take place.

SUMMARY OF THE INVENTION

It is an object of this invention to provide a receiver device which is capable of estimating both intersymbol interference and frequency offset.

It is another object of this invention to provide a receiver device of the type described, which is capable of eliminating both the intersymbol interference and the frequency offset even when both the intersymbol interference and the frequency offset take place.

According to an aspect of this invention, a receiver is supplied with a reception signal which is transmitted through a transmission path and which is subjected to an intersymbol interference and a frequency offset, to produce an output signal substantially exempted from said intersymbol interference and said frequency offset. The receiver comprises a matched filter which has a filter characteristic matched with the transmission path and which is supplied with the reception signal for producing a filter output signal, frequency offset estimating means supplied with the filter output signal for estimating the frequency offset from the filter output signal to produce an estimation signal representative of the frequency offset, and equalizing means supplied with the reception signal and the estimation signal for equalizing the intersymbol interference and the frequency offset to produce the output signal.

According to another aspect of this invention, a receiver is supplied with a reception signal which is transmitted through a transmission path and which is subjected to an intersymbol interference and a frequency offset, to produce an output signal substantially exempted from the intersymbol interference and the frequency offset. The receiver comprises a matched filter which has a filter characteristic matched with the transmission path and which is supplied with the reception signal for producing a filter output signal, frequency offset estimating means supplied with the filter output signal for estimating the frequency offset to produce an estimation signal representative of the frequency offset, and equalizing means supplied with the filter output signal and the estimation signal for equalizing the intersymbol interference and the frequency offset to produce the output signal.

DESCRIPTION OF THE PREFERRED EMBODIMENTS

Principles of the Invention

Figure 1:
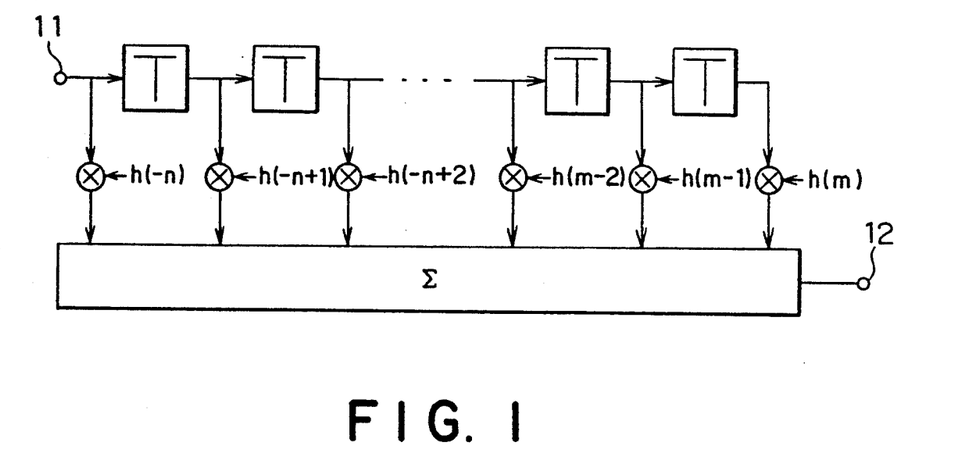
FIG. 1 shows a block diagram of a transversal filter equivalent to a transmission path.

Referring to FIG. 1, consideration is made about a transmission path model which is represented by a discrete model having a transmission symbol period T and which brings about an intersymbol interference. Such a transmission path which provides the intersymbol interference is equivalently represented by a transversal filter, as illustrated in FIG. 1. The illustrated transversal filter has a delay circuit and a plurality of taps which are equal in number to n+m+1 where n and m are natural numbers. The delay circuit comprises a plurality of delay units from which the taps are derived and which are therefore equal in number to n+m. Each of the delay units is assumed to have a delay time equal to the transmission symbol period T. The taps are supplied with tap coefficients depicted at h(−n), h(−n+1), . . . , h(0), . . . , h(m−1), and h(m).

In FIG. 1, an input signal is given to an input terminal 11 and successively delayed by the delay units. The input signal is delivered to the taps to be multiplied by the tap coefficients h(−n) to h(m) and to calculate products of delayed input signals and the tap coefficients h(−n) to h(m). The products are sent to an adder to be produced as an output signal through an output terminal 12. The output signal may be considered as a reception signal which is supplied to a receiver and which is represented by r(k).

In FIG. 1, let the transmission symbol be represented by s(k) at a time instant kT where k is an integer. Under the circumstances, the reception signal r(k) is subjected to the intersymbol interference within the transversal filter, namely, the transmission path and is given by:

$$r(k) = \sum_{i=-n}^{+m} s(k-i) \cdot h(i). \tag{1}$$

Figure 2:
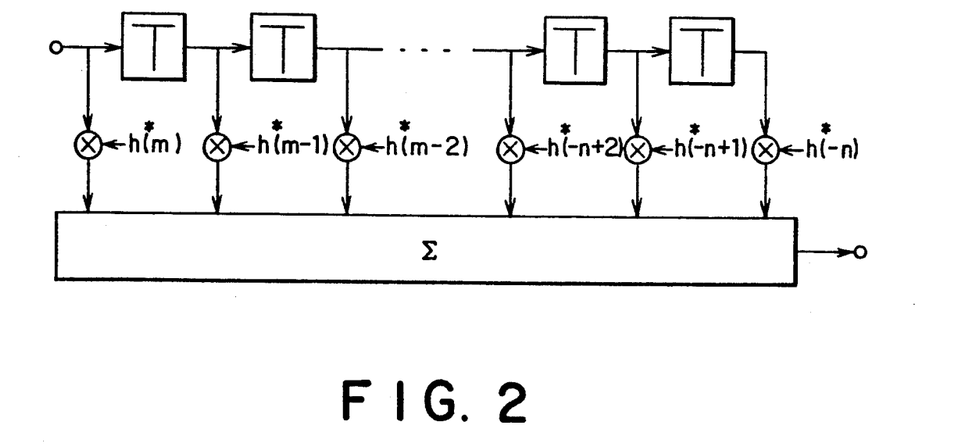
FIG. 2 shows a block diagram of a transversal filter which is usable as a matched filter.

The transmission path illustrated in FIG. 1 can be matched with a transversal filter which is shown in FIG. 2 and which has a plurality of taps equal in number to n+m+1. The transversal filter of FIG. 2 may be called a matched filter. An output signal y(k) of the matched filter is given by:

$$y(k) = \sum_{i=-m}^{+n} r(k-i) \cdot h^*(-i). \tag{2}$$

where * is representative of a complex conjugate.

In the transmission path model of FIG. 1, let rotation of signal points take place due to a beat frequency or a frequency offset resulting from incompleteness of a coherent detection system. Such rotation of the signal points may be considered as rotation of a phase plane of r(k) shown by Equation (1). Specifically, when a beat occurs in an angular frequency ω, r(k) is converted into r'(k) given by:

$$r'(k) = r(k) \cdot \exp(j \cdot \omega kT/2\pi + \phi), \tag{3}$$

where φ is representative of an initial phase and j, an imaginary unit. Thus, the matched filter has a filter characteristic matched with or related to the transmission path.

In Equation (3), it is possible to completely compensate for the initial phase φ by the use of a conventional technique because the initial phase is constant.

On the other hand, an influence of the angular frequency ω can not be completely compensated by the use of the conventional technique because a phase of the reception signal is varied at a speed of the angular frequency ω.

However, it is possible to obtain a sufficient reception characteristic by the use of a conventional equalizing technique by estimating the angular frequency ω from the reception signal and by compensating for an influence of the angular frequency ω.

Herein, description will be directed to a method of estimating the angular frequency ω by the use of an output signal sent from the matched filter. Let ωkT be approximately equal to ω(k−i)T, (4) where i=−m, −m+1, . . . , n−1, and n.

In such approximation, a phase rotation which results from a beat frequency is neglected within a delay time delayed by the matched filter. It is assumed that the delay time of the matched filter is equal to a delay time which occurs in the transmission path and that a radio frequency (RF) and a transmission rate are equal to 1 GHz and 250 kbaud, respectively. In addition, the delay time is assumed to be equal to 5 symbol times in the transmission path. Under the circumstances, a maximum phase error resulting from the above-mentioned approximation is represented by:

$$5 \times \omega/(250 \times 10^3) \text{ (rad)}.$$

Herein, let a frequency offset or frequency deviation between a local frequency signal and the reception signal be equal to 1 ppm. In this case, the angular frequency ω becomes equal to 1 kHz while the maximum phase error becomes equal to 0.12566 (rad), namely, 7.2 degrees. Such a maximum phase error does not practically bring about any problem.

When Equation (4) is used, an output signal or a filtered signal of the matched filter is given by the following approximation formula:

$$y'(k) \approx y(k) \cdot \exp(j \cdot (\omega kT/2\pi + \phi)). \tag{5}$$

On the other hand, y(k) is given by the use of Equations (1) and (2) by:

$$y(k) = \sum_{i=-m-n}^{m+n} s(k + i)C(i), \quad (6)$$

where Ci is representative of an autocorrelation function.

The autocorrelation function Ci is defined by:

$$C(k) = \sum_{i=-m}^{n} h(i)h'(i + k), \quad (7)$$

where $k = -m-n, -m-n+1, \ldots, n+m-1, n+m$, and where $h'(i) = h^*(i)$ for $i = -m, -m+1, \ldots, n-1, n$, and $$h'(i) = 0 \text{ for otherwise.} \quad (8)$$

Herein, a mean square value of y'(k) is assumed to be calculated over a time interval NT from a time instant 0 to a time instant (N−1)T in accordance with the following equation.

$$E(y'^2) = E(y^2) \cdot \sum_{k=0}^{N-1} \exp(2j \cdot (\omega kT/2\pi + \phi)) \quad (9)$$

$$= \left[\sum_{k=0}^{N-1} \left( \sum_{i=-m-n}^{m+n} s(k+i)^2 C(i)^2 + \sum_{\substack{i=-m-n \\ i \neq j}}^{m+n} \sum s(k+i)s(k+j)C(k+i)C(k+j) \right) \right.$$

$$\left. \exp\{2j \cdot (\omega kT/2\pi + \phi)\}\right] 1/N.$$

Let each of the transmission symbols s(k) take a selected one of two values +1 and −1 and occur independently of each other.

If N is extremely large, the second term of Equation (9) gradually approximates to zero. Therefore, E(y'²) is rewritten into:

$$E(y'^2) = \sum_{i=-m-n}^{m+n} C(i)^2 \cdot \sum_{k=0}^{N-1} \exp\{2j \cdot (\omega kT/2\pi + \phi)\}/N. \quad (10)$$

The following formula holds with reference to C(i) defined by Equation (7), namely, $$C(i) = C(-i)^*.$$

In addition, consideration is made about the following formulae related to trigonometric functions:

$$\sum_{k=0}^{N-1} \sin(k\theta + \phi) = \sin\{\phi + (N-1)\theta/2\}\sin(N\theta/2)/\sin(\theta/2)$$

$$\sum_{k=0}^{N-1} \cos(k\theta + \phi) = \cos[\phi + (N-1)\theta/2]\sin(N\theta/2)/\sin(\theta/2).$$

Thereafter, substitution of the above formulae into Equation (10) gives:

$$E(y'^2) = \left\{ C(0)^2 + 2\sum_{k=1}^{n+m}(\alpha(k)^2 - \beta(k)^2) \right\} \quad (11)$$

$$[\cos[\phi/2 + (N-1)\theta]\sin(N\theta)/\sin(\theta) +$$

$$j\sin\{\phi/2 + (N-1)\theta\}\sin(N\theta)/\sin(\theta)],$$

where
$\alpha(i) = \text{Real}(C(i))$,
$\beta(i) = \text{Imag}(C(i))$, and
$\theta = \omega T/2\pi$.

According to the above-mentioned definition, $\theta$ is equal to phase rotation which takes place during a single symbol time interval due to the best frequency. This shows that estimation of $\theta$ may be considered as being equivalent to estimation of the beat frequency ($\omega$).

From Equation (11), it is possible to calculate a ratio between the real part and the imaginary part of E(y'²). The ratio is given by:

$$\text{Imag}[E(y'^2)]/\text{Real}[E(y'^2)] = \tan[(N-1)\theta + \phi/2]. \quad (12)$$

From Equation (12), it is readily understood that the ratio between the real part and the imaginary part is determined by $\theta$, $\phi$, and N only. In other words, Equation (12) shows that an argument of E(y'²) can be calculated and that a sum of the initial phase $\phi$ and $(N-1)\theta$ can be estimated.

Let first and second mean values E1 and E2 be calculated during a first time interval between the time instant 0 and the time instant (N1−1)T and during a second time interval between the time instant 0 and another time instant (N2−1)T, respectively, where N2 is greater than N1. Under the circumstances, the following calculation can be carried out with reference to Equation (12).

$$\text{Arctan}[\text{Imag}(E2)/\text{Real}(E2)] - \quad (13)$$

$$\text{Arctan}[\text{Imag}(E1)/\text{Real}(E1)] = (N2 - N1)\theta.$$

As is apparent from Equation (13), it is possible to estimate $\theta$ by determining N1 and N2.

Thus, the frequency offset can be precisely estimated by processing the output signal of the matched filter even when the reception signal is subjected to distortions resulting from the intersymbol interference. This shows that the frequency offset and the intersymbol interference can be equalized by a usual or linear equalizer circuit through the above-mentioned procedure even when both the intersymbol interference and the frequency offset occur in the reception signal. Under the circumstances, it is possible to realize digital signal transmission of a high quality by equalizing both the frequency offset and the intersymbol interference.

Alternatively, an alternate equalizer circuit exists which can favorably carry out equalization when the alternate equalizer circuit is supplied with the filtered signal or the output signal of the matched filter in comparison with the case where the reception signal is directly supplied to the alternate equalizer circuit. Such an alternate equalizer circuit may be, for example, a decision feedback equalizer circuit. In this event, the matched filter is supplied with the reception signal to produce a filtered signal which is delivered to a frequency offset estimation circuit to produce an estimated frequency offset and to the alternate equalizer circuit to equalize the estimated frequency offset and the filtered signal. As a result, the alternate equalizer circuit can produce an output signal which is exempted from the frequency offset and the intersymbol interference.

On the other hand, consideration will be made about a conventional receiver for removing a frequency offset so as to be compared with the receiver according to this invention. It is assumed that the transmission symbol takes two values of +1 and −1, like in the above and that the frequency offset is estimated by the use of a mean square value of the reception signal. When the reception signal is subjected to the frequency offset and the intersymbol interference, the mean square value of the reception signal is given by the use of both Equation (3) and the trigonometric relationships mentioned above by:

$$E(r^2) = \left\{ \sum_{k=0}^{N-1} \sum_{i=-n}^{m} h(i)^2/N \right\} \cdot [\cos\{\phi/2 + (N-1)\theta\} \quad (14)$$
$$\sin(N\theta)/\sin(\theta) + j\sin\{\phi/2 + (N-1)\theta\}$$
$$\sin(N\theta)/\sin(\theta)]$$

Inasmuch as h(i) is generally a complex constant, the term of h(i) is rewritten into:

$$A + jB = \sum_{k=0}^{N-1} \sum_{i=-n}^{m} h(i)^2/N \quad (15)$$

From this fact, it is readily understood that the frequency offset can not be easily estimated from Equations (14) and (15). For example, let consideration be made about a 2-ray channel model where h(0) = +1 and h(1) = +j. In this case, n and m become equal to 0 and 1, respectively, and $$\sum_{i=-n}^{m} h(i)^2$$

in Equation (15) is always equal to 0. As a result, Equation (14) always becomes equal to 0. This shows that the frequency offset can not be estimated.

First Embodiment

Figure 3:
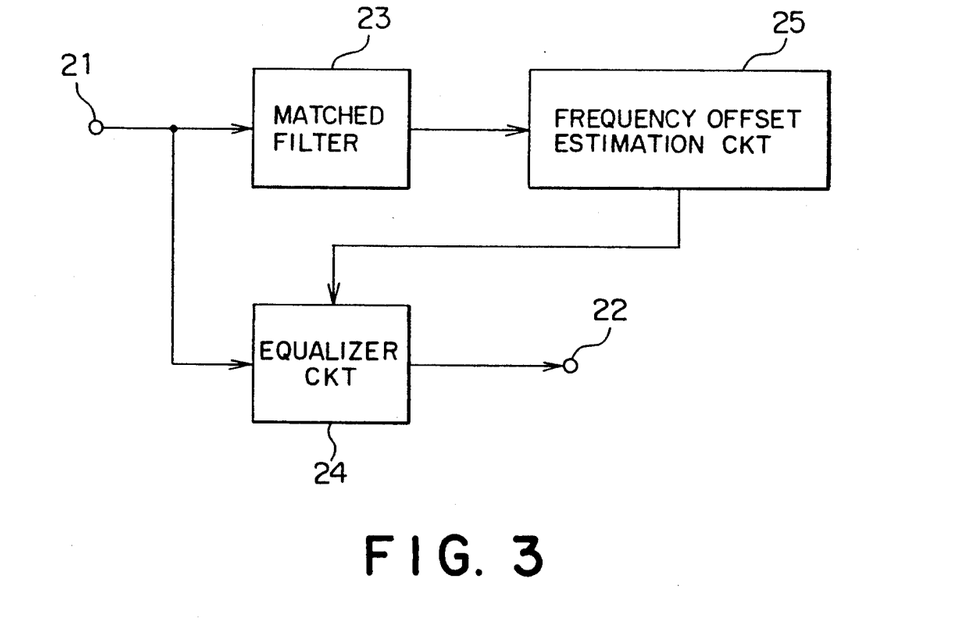
FIG. 3 shows a block diagram of a receiver according to a first embodiment of this invention.

Referring to FIG. 3, a receiver according to a first embodiment of this invention is supplied with a reception signal through an input terminal 21 to produce an output signal through an output terminal 22. It is assumed that the reception signal is subjected to intersymbol interference during transmission. In the example being illustrated, the reception signal is delivered to a matched filter 23 and an equalizer circuit 24 in parallel. The matched filter 23 may be similar in structure to that illustrated in FIG. 2. Each of the matched filter 23 and the equalizer circuit 24 comprises a processor which can estimate an impulse response of a transmission path from the reception signal. In each of the matched filter 23 and the equalizer circuit 24, internal parameters are determined on the basis of the estimated impulse response. The matched filter 23 and the equalizer circuit 24 are known in the art and will not be described in detail.

At any rate, the matched filter 23 filters the reception signal to produce a filter output signal or a filtered signal which is depicted at the formula (3). The filter output signal is sent to a frequency offset estimation circuit 25 which carries out operation indicated by Equations (11), (12), and (13). As a result, the frequency offset estimation circuit 25 calculates θ of Equation (13) to produce a frequency offset signal representative of θ. The frequency offset signal may be called an estimation signal and is delivered to the equalizer circuit 24 together with the reception signal.

The equalizer circuit 24 equalizes the reception signal on the basis of the frequency offset signal to produce, through the output terminal 22, the output signal which is exempted from the frequency offset and the intersymbol interference and which may therefore be called an equalized signal.

Second Embodiment

Figure 4:
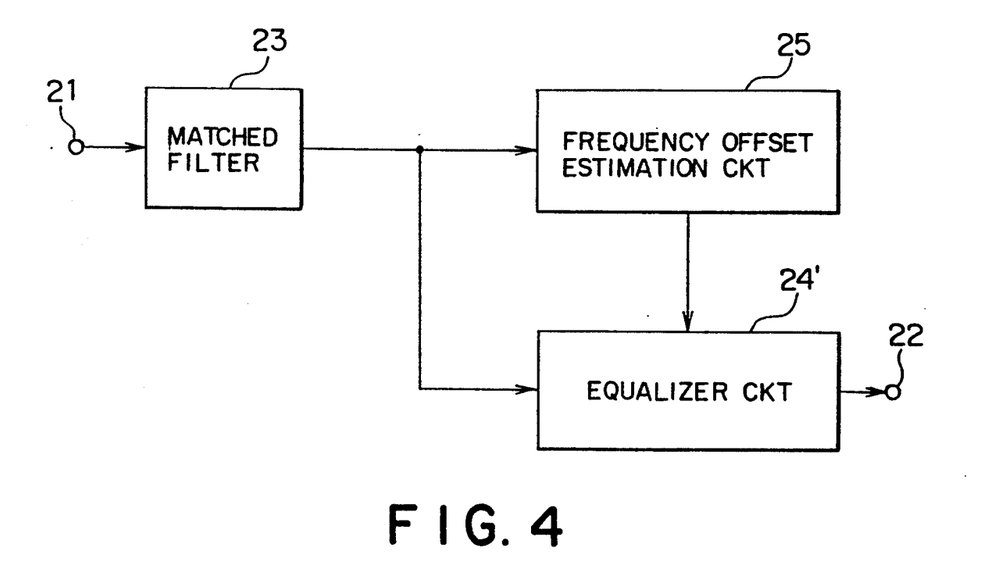
FIG. 4 shows a block diagram of a receiver according to a second embodiment of this invention.

Referring to FIG. 4, a receiver according to a second embodiment of this invention is similar to that illustrated in FIG. 3 except that an equalizer circuit 24' is supplied from the matched filter 23 with the filter output signal instead of the reception signal. Like in FIG. 2, the frequency offset estimation circuit 25 supplies the equalizer circuit 24' with the frequency offset signal which is representative of θ indicated in Equation (13) and which may be called an estimation signal. The illustrated equalizer circuit 24' comprises a processor and determines internal parameters by the processor to equalize the filter output signal by the frequency offset signal and to produce the output signal which may be called an equalized signal.

Third Embodiment

Figure 5:
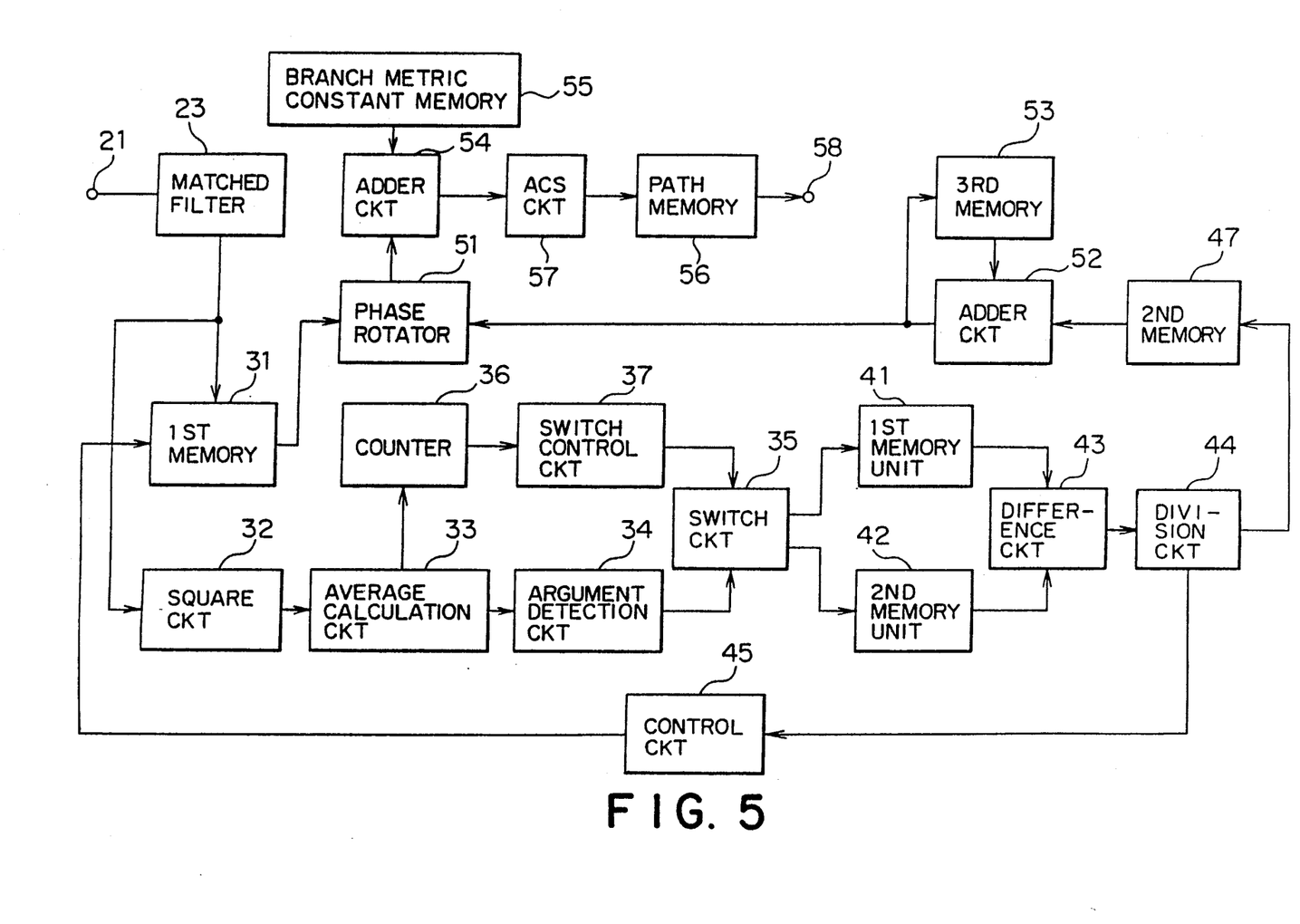
FIG. 5 shows a block diagram of a receiver according to a third embodiment of this invention.

Referring to FIG. 5, a receiver according to a third embodiment of this invention carries out equalization on the basis of maximum likelihood sequence estimation (MLSE) which is disclosed by J. F. Hayes in a digest of news and events of interest to the IEEE Communication Society, Volume 13, 2 and which is entitled "The Viterbi Algorithm Applied to Digital Data Transmission". Therefore, description will not be made about the maximum likelihood sequence estimation any longer.

In FIG. 5, a reception signal is supplied through an input terminal 21 to a matched filter 23 to be filtered into a filter output signal. The filter output signal is delivered to a first memory 31 to be memorized therein on one hand and to a square circuit 32 on the other hand. The filter output signal is squared to calculate a square of the filter output signal and to be produced as a square signal representative of the square. The square signal is sent to an average calculation circuit 33 to carry out calculation shown by Equation (9). Thus, a mean square value is calculated by the average calculation circuit 33 in the form of Equation (11) and supplied as a mean square signal to an argument detection circuit 34. The argument detection circuit 34 carries out calculation in accordance with Equation (12) to obtain an argument shown on the right side of Equation (12). The argument thus calculated is sent to a switch circuit 35 as an argument signal representative of the argument.

On the other hand, the average calculation circuit 33 supplies a counter 36 with a pulse each time when the mean square value is calculated by the average calculation circuit 33. The counter 36 is successively counted up each time when the pulse is given from the average calculation circuit 33 to the counter 36. The counter 36 is given first and second predetermined counts N1 and N2 where N2 is greater than N1. When the count becomes equal to the first and the second predetermined counts N1 and N2, the counter 36 supplies first and second control signals to a switch control circuit 37.

When the count reaches the first predetermined count N1, the switch control circuit 37 controls the switch circuit 35 to make the argument detection circuit 34 deliver the argument signal to a first memory unit 41. From this fact, it is readily understood that the argument signal is memorized into the first memory unit 41 when the mean square signal is counted to the first predetermined count N1.

When the count reaches the second predetermined count N2, the switch control circuit 37 controls the switch circuit 35 to make the argument detection circuit 34 deliver the argument signal to a second memory unit 42. Thus, the argument signal is sent to the second memory unit 42 when the mean square signal is counted to the second predetermined count N2.

As a result, the first and the second memory units 41 and 42 are loaded with the arguments represented by the first and the second terms on the left side of Equation (13), respectively.

The arguments are sent from the first and the second memory units 41 and 42 to a difference circuit 43 to calculate a difference between the arguments, as shown in Equation (13). The difference is delivered to a division circuit 44 as a difference signal.

The illustrated division circuit 44 is given a constant value equal to N2−N1 as a constant signal and divides the difference signal by the constant signal to calculate the frequency offset $\theta$ shown in Equation (13). The calculated frequency offset $\theta$ is sent from the division circuit 44 to a control circuit 45 and to a second memory 47 as an offset signal.

Responsive to the offset signal, the control circuit 45 enables the first memory 31 to make the same deliver a content to a phase shifter or phase rotator 51 as a memorized reception signal.

As shown in FIG. 5, the phase rotator 51 is connected to an adder circuit 52 which cooperates with the second memory 47 and a third memory 53 connected to the adder circuit 52. The frequency offset $\theta$ is sent as the offset signal from the second memory 47 to the adder circuit 52 connected to the third memory 53 which is initially kept at zero. The adder circuit 52 sums up contents of the second and the third memories 47 and 53 each time when the phase rotator 51 is supplied with the memorized reception signal from the first memory 31. The adder circuit 52 successively supplies a sum of the frequency offsets to the phase rotator 51 as an offset sum signal. The phase rotator 51 rotates a phase of the memorized reception signal in response to the offset sum signal to produce a phase rotated signal when the memorized reception signal is sent from the first memory 31 to the phase rotator 51. Such operation may be executed by a signal processor operable in accordance with software.

The phase rotated signal is delivered to an adder circuit 54 connected to a branch metric constant memory 55. The adder circuit 54 adds the phase rotated signal to an output signal of the branch metric constant memory 55 to produce a branch metric signal. The branch metric signal is sent from the adder circuit 54 to a path memory 56 through an ACS (Add, Compare, Select) circuit 57. As known in the art, such a combination of the ACS circuit 57 and the path memory 56 forms, together with the branch metric constant memory 55 and the adder circuit 54, a maximum likelihood estimation circuit which is operable in a known manner and which will not be described any longer. At any rate, a demodulated signal is produced from the path memory 56 to an output terminal 58.

Figure 6:
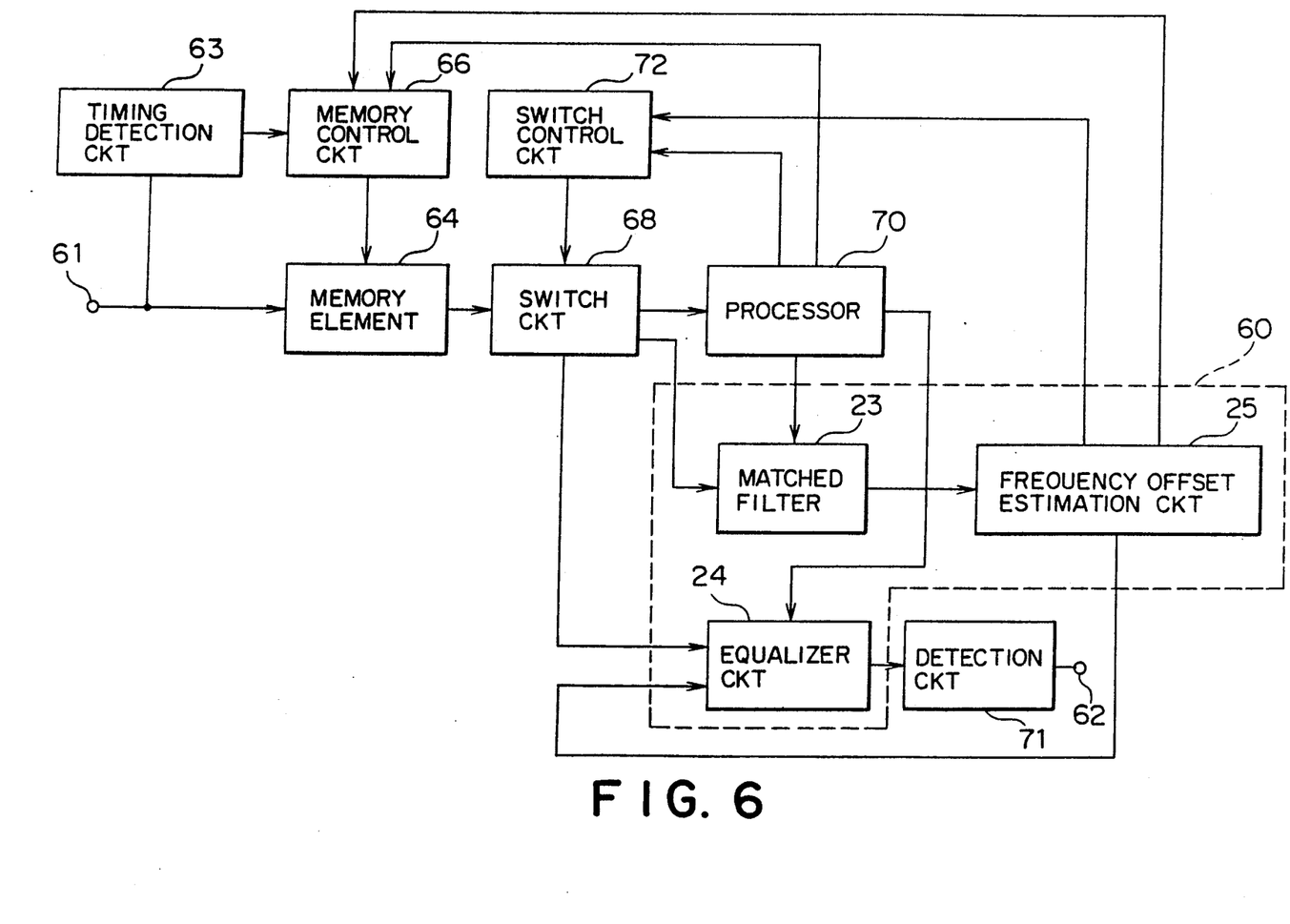
FIG. 6 shows a block diagram of a linear equalization system which comprises the receiver illustrated in FIG. 3.

Referring to FIG. 6, description will be directed to a linear equalization system which comprises the receiver illustrated in FIG. 3 and depicted at 60 in FIG. 6. The linear equalization system has a system input terminal 61 and a system output terminal 62 and is used for receiving a reception signal of a burst type which has a leading edge and a trailing edge. The reception signal is supplied to a timing detection circuit 63 and a memory element 64. The timing detection circuit 63 detects the leading and the trailing edges of each burst to produce leading and trailing edge signals which are representative of the leading and the trailing edges of each burst, respectively. Supplied with the leading and the trailing edge signals, a memory control circuit 66 accesses the memory element 64 to control a memorizing operation of the memory element 64. Specifically, a start and an end of the memorizing operation are controlled by the leading and the trailing edges of each burst. As a result, the bursts are memorized one by one in the memory element 64 as a memorized burst under control of the memory control circuit 66. Thereafter, the memory control circuit 66 controls the memory element 64 so that the memorized burst is sent to a switch circuit 68. Inasmuch as the switch circuit 68 is initially set so that each memorized burst is delivered from the memory element 64 to a processor 70 through the switch circuit 68, the memorized burst is sent to the processor 70 through the switch circuit 68.

The processor 70 detects a preamble signal from the memorized burst and estimates an impulse response of a transmission path from the preamble signal to supply a set of tap signals to the receiver 60 similar in structure and operation to that illustrated in FIG. 3.

Herein, it is to be noted that the receiver 60 comprises a matched filter 23, an equalizer circuit 24, and a frequency offset estimation circuit 25, like in FIG. 3. In addition, the equalizer circuit 24 is connected to a detection circuit 71 which is operable to carry out detection and to produce the demodulated signal through the system output terminal 62. The matched filter 23 is formed by a transversal filter which has a plurality of taps, like in FIG. 2.

More particularly, the processor 70 calculates parameters of the equalizer circuit 24 from the impulse response of the transmission path estimated by the processor 70. The parameters may be internal parameters such that mean square errors between input and output signals of the detection circuit 71 are minimized. Furthermore, the processor 70 supplies the respective taps of the matched filter 23 with tap signals. In addition, the processor 70 supplies the memory control circuit 66 and a switch control circuit 72 with first and second control signals, respectively.

Responsive to the first control signal, the memory control circuit 66 makes the memory element 64 deliver a content, namely, a memorized burst to the matched filter 23 through the switch circuit 68. Under the circumstances, the matched filter 23 filters the memorized signal sent from the memory element 64 into a filtered signal and supplies the filtered signal to the frequency offset estimation circuit 25.

The frequency offset estimation circuit 25 calculates the frequency offset $\theta$ given by Equation (13) from the filtered signal and supplies the equalizer circuit 24 with the frequency offset signal representative of the frequency offset $\theta$. The illustrated frequency offset estimation circuit 25 further supplies the memory control circuit 66 and the switch control circuit 72 with first and second local control signals to make the memory element 64 supply the memorized burst to the equalizer circuit 24 through the switch circuit 68.

Figure 7:
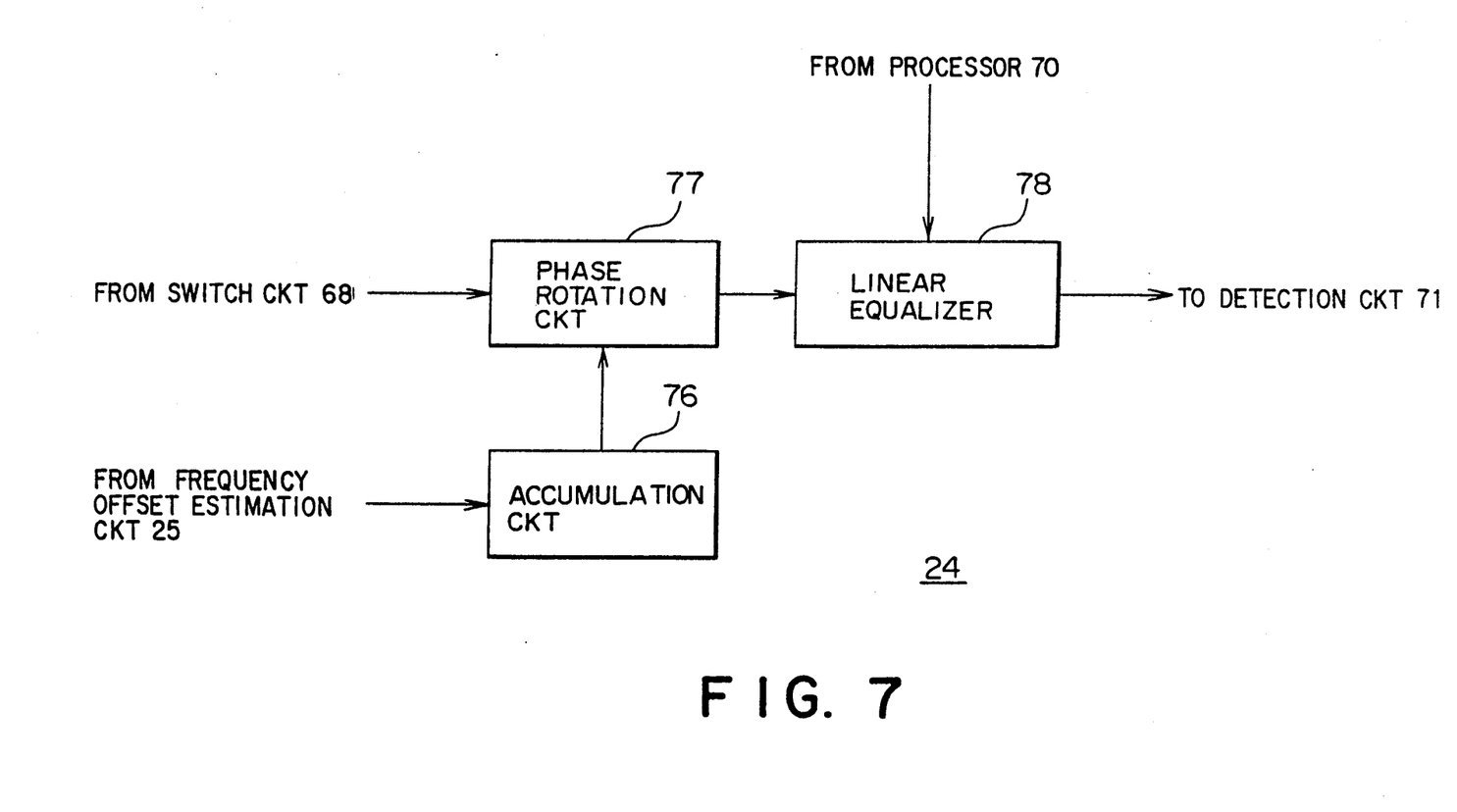
FIG. 7 shows a block diagram of an equalizer circuit used in the linear equalization system illustrated in FIG. 6.

Referring to FIG. 7 together with FIG. 6, the equalizer circuit 24 is operable in response to the memorized burst sent from the switch circuit 68, the frequency offset signal, and the parameter signals sent from the processor 70 to supply the detection circuit 71 with an equalized signal. To this end, the equalizer circuit 24 comprises an accumulation circuit 76, a phase rotation circuit 77, and a linear equalizer 78. Specifically, the phase rotation circuit 77 is supplied with the memorized burst or the memorized reception signal sent from the memory element 64 through the switch circuit 68. Each time when the memorized reception signal is given to the phase rotation circuit 77, the accumulation circuit 76 accumulates the frequency offset signal to supply a result of accumulation to the phase rotation circuit 77 as an accumulation signal. In consequence, the phase rotation circuit 77 rotates a phase of the memorized reception signal by a phase determined by the accumulation signal to compensate for the frequency offset and to produce an offset compensated signal. Thus, the linear equalizer 78 equalizes the offset compensated signal in accordance with the parameter signals to supply the equalized signal to the detection circuit 71. The detection circuit 71 detects or judges the equalized signal to produce the output signal representative of a result of detection through the system output terminal 62.

Figure 8:
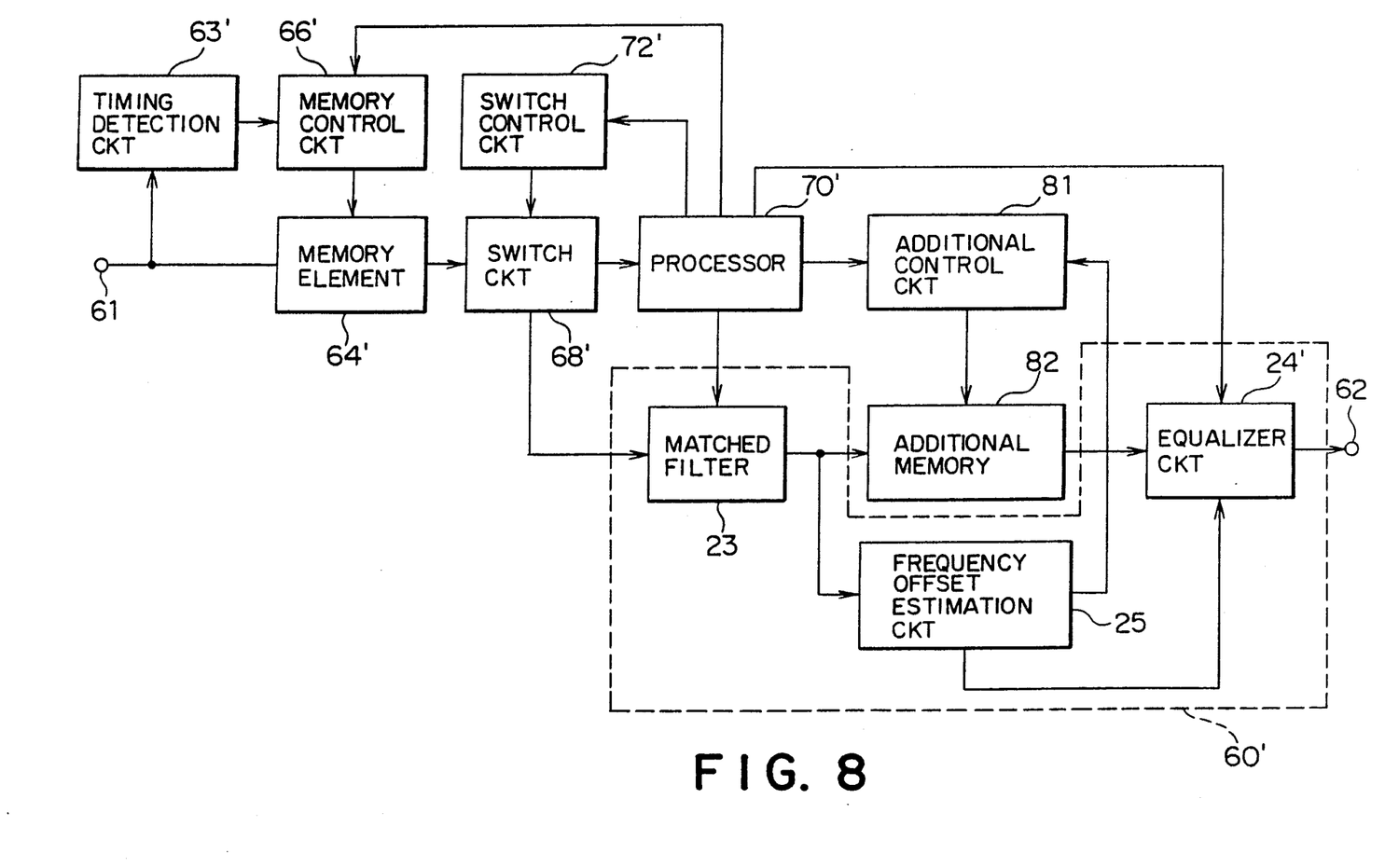
FIG. 8 shows a block diagram of a decision feedback equalization system which comprises the receiver illustrated in FIG. 4.

Referring to FIG. 8, description will be made about an equalization system of a decision feedback type which may be called a decision feedback equalization system and which comprises a receiver device (depicted at 60 ' in FIG. 8) illustrated in FIG. 4. The illustrated receiver device 60' comprises a matched filters 23, an equalizer circuit 24', and a frequency offset estimation circuit 25, like in FIG. 4. Herein, it is to be noted that the equalizer circuit 24' may be formed by a decision feedback equalizer, as will become clear later. Like in FIG. 6, it is assumed that a reception signal is given to the illustrated system in the form of a burst through a system input terminal 61 and is equalized by the illustrated system to be produced as an equalized signal through an output terminal 62.

In FIG. 8, the reception signal is delivered to a timing detection circuit 63' and a memory element 64' which are operable in a manner similar to the timing detection circuit 63 and the memory element 64 (FIG. 6), respectively. In this connection, leading and trailing edges of each burst are detected by the timing detection circuit 63 and produced as leading and trailing edge signals, respectively. Responsive to the leading and the trailing edge signals, a memory control circuit 66' controls a memorizing operation of the memory element 64'. Specifically, a start and an end of the memorizing operation of the memory element 64' are controlled by the memory control circuit 66'. As a result, the bursts are successively stored at every burst in the memory element 64', . After each burst is stored in the memory element 64', the memory control circuit 66' controls the memory element 64' so that the memorized burst is read out of the memory element 64' and sent to a switch circuit 68'. Inasmuch as the switch circuit 68' is initially set so that the memorized burst is delivered to a processor 70', the memorized burst is sent through the switch circuit 68' to the processor 70'.

The processor 70' detects a preamble signal from the memorized burst to estimate an impulse response of a transmission path as an estimated impulse response and to produce a set of tap signals representative of tap coefficients of the matched filter 23. In addition, the processor 70' calcluates an impulse response obtained by convolution between the estimated impulse response and the tap coefficients of the matched filter 23 and thereafter calculates internal parameters of the equalizer circuit 24'. Such internal parameters may be such that mean square errors between input and output signals of a detection circuit 71' become a minimum. At any rate, the internal parameters are delivered to the equalizer circuit 24'. Moreover, the processor 70' supplies the memory control circuit 66' and a switch control circuit 72' with first and second control signals, respectively, to make the memory element 64' deliver the memorized burst or reception signal to the matched filter 23 through the switch circuit 68'. In addition, the processor 70' suppiles a third control signal to an additional control circuit 81 to make an additional memory 82 memorize the filtered signal sent from the matched filter 23. In this event, the filtered signal is also delivered to the frequency offset estimation circuit 25B.

Responsive to the filtered signal sent from the matched filter 23, the frequency offset estimation circuit 25 calculates the frequency offset $\theta$ in accordance with Equation (13) to supply the frequency offset signal to the equalizer circuit 24'. Furthermore, the frequency offset estimation circuit 25 sends an additional control signal to the additional control circuit 81 to make the additional memory 82 supply a memorized signal to the equalizer circuit 24'.

Figure 9:
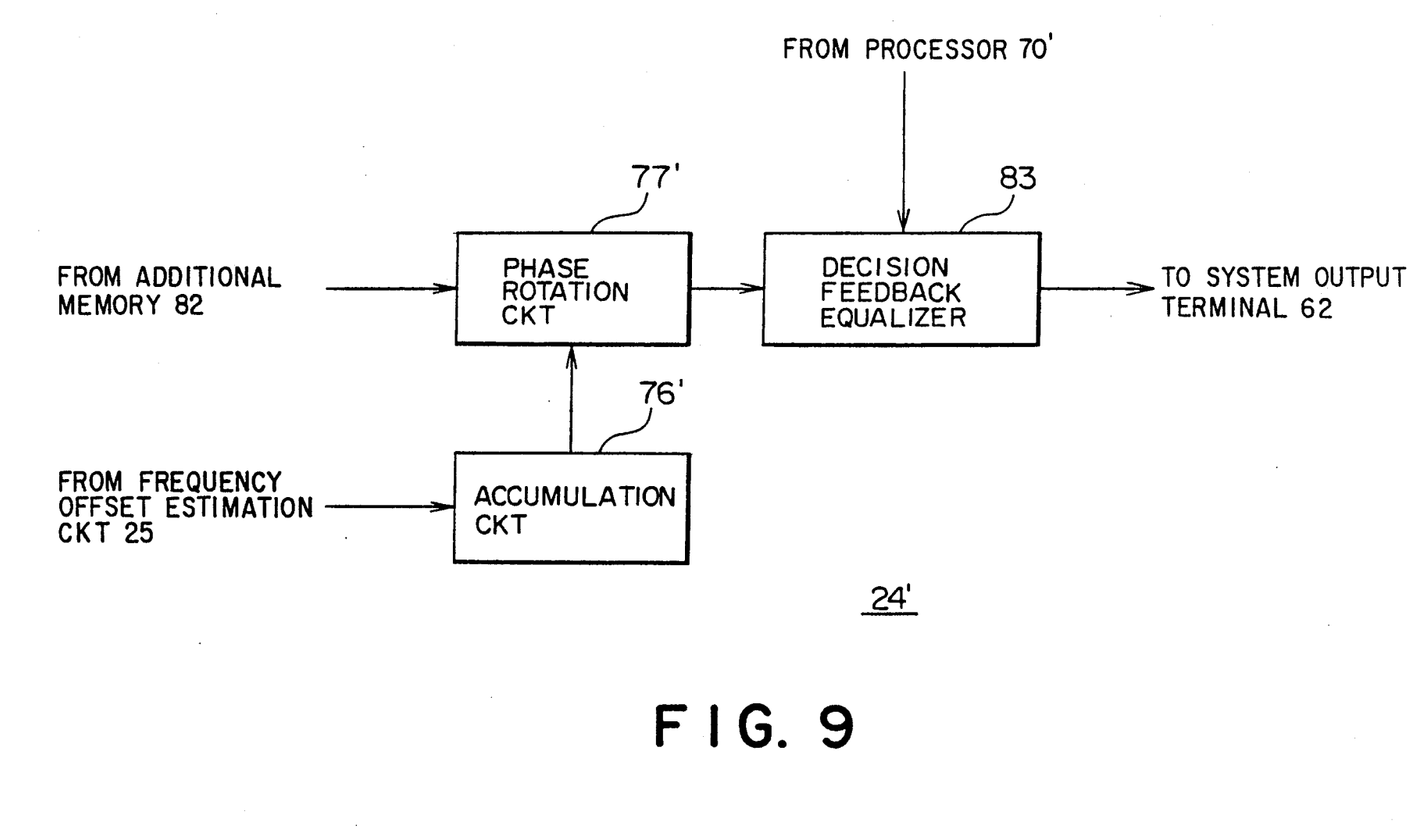
FIG. 9 show a block diagram of an equalizer circuit used in the decision feedback equalization system illustrated in FIG. 8.

Referring to FIG. 9 in addition to FIG. 8, the illustrated equalizer circuit 24' comprises an accumumlator 76', a phase rotation circuit 77', and a decision feedback equalizer 83. More specifically, the phase rotation circuit 77' is supplied with the memorized signal from the additional memory 82. The accumulator 76' accumulates the frequency offset signals to supply a result of accumulation to the phase rotation circuit 77' as the accumulation signal each time when the memorized signal is delivered to the phase rotation circuit 77'. The phase rotation circuit 77' rotates a phase of the memorized reception signal by a phase determined by the accumulation signal to supply a phase adjusted signal to the decision feedback equalizer 83. The decision feedback equalizer 83 equalizes the phase adjusted signal in accordance with the internal parameters determined by the processor 70' to produce the equalized signal through the system output terminal 62. The illustrated decision feedback equalizer 83 comprises a detection circuit as illustrated in FIG. 7 in addition to an equalizer unit. In this connection, no detection circuit is connected to the decision feedback equalizer 83. Thus, the illustrated equalizer circuit 24' is given the filtered signal through the matched filter 23 instead of the reception signal. This is because the decision feedback equalizer 83 (FIG. 9) exhibits a high ability of equalization on equalization of a signal from a matched filter rather than equalization of a reception signal, as mentioned by E. A. Lee et al in "Digital Communication" published by Kluwer Academic Publishers, 1988.

While this invention has thus far been described in conjunction with a few embodiments thereof, it will readily be possible for those skilled in the art to put this invention into practice in various other manners. For example, in FIGS. 6 and 8, the matched filter 23 and the processor 70 or 70' may be combined together and may be collectively called a matched filter unit while the processor 70 or 70' and the equalizer circuit 24 or 24' may be collectively called an equalizer unit. In FIG. 5, a single memory may be used instead of the first and the second memory units 41 and 42.

What is claimed is:

1. A receiver supplied with a reception signal which is transmitted through a transmission path and which is subjected to an intersymbol interference and a frequency offset related to said intersymbol interference said receiver producing an output signal substantially exempted from said intersymbol interference and said frequency offset and comprising:
   a matched filter which has a filter characteristic matched with said transmission path and which is supplied with said reception signal for producing a filter output signal,
   frequency offset estimating means supplied with said filter output signal for estimating said frequency offset from said filter output signal to produce an estimation signal representative of said frequency offset, and
   equalizing means supplied with said reception signal and said estimation signal for equalizing said intersymbol interference and said frequency offset of said reception signal on the basis of said estimation signal to produce said output signal.

2. A receiver as claimed in claim 1, wherein said equalizing means comprises:
   accumulating means successively supplied with said estimation for successively accumulating said estimation signal to produce an accumulation signal representative of accumulation of said estimation signal;
   phase rotating means responsive to said reception signal and said accumulation signal for rotating a phase of said reception signal on the basis of said accumulation signal to produce a phase rotated signal; and
   linear equalizing means responsive to said phase rotated signal and said reception signal for linearly equalizing said phase rotated signal to produce said output signal.

3. A receiver supplied with a reception signal which is transmitted through a transmission path and which is subjected to an intersymbol interference and a frequency offset related to said intersymbol interference, said receiver producing an output signal substantially exempted from said intersymbol interference and said frequency offset and comprising:
   a matched filter which has a filter characteristic matched with said transmission path and which is supplied with said reception signal for producing a filter output signal,
   frequency offset estimating means supplied with said filter output signal for estimating said frequency offset to produce an estimation signal representative of said frequency offset, and
   equalizing means supplied with said filter output signal and said estimation signal for equalizing said intersymbol interference and said frequency offset to produce said output signal.

4. A receiver as claimed in claim 3, wherein said equalizing means comprises:
   accumulating means successively supplied with said estimation signal for successively accumulating said estimation signal to produce an accumulation signal representative of accumulation of said estimation signal;
   phase rotating means responsive to said reception signal and said accumulation signal for rotating a phase of said reception signal on the basis of said accumulation signal to produce a phase rotated signal; and
   decision feedback equalizing means responsive to said phase rotated signal and said filter output signal for equalizing said phase rotated signal to produce said output signal.

5. A receiver supplied with a reception signal which is transmitted through a transmission path and which is subjected to an intersymbol interference and a frequency offset, said receiver deriving an offset signal representative of said frequency offset from said reception signal and comprising:
   a matched filter supplied with a reception signal for producing a filter output signal,
   square calculation means supplied with said filter output signal for calculating a square of said filter output signal to produce a square signal representative of said square of the filter output signal,
   average calculation means for calculating an average of said square signal to produce an average signal representative of said average of the square signal,
   a counter for counting said average signal to produce a count signal representative of a count of said average signal,
   an argument detection circuit supplied with said average signal for detecting an argument of said average signal to successively produce an argument signal representative of said argument,
   signal control means operable in cooperation with said counter and said argument detection circuit for producing first and second ones of said argument signals when said count becomes equal to a first constant value N1 and a second constant value N2 greater than N1, respectively,
   memory means for memorizing said first and second ones of the argument signals as first and second memorized argument signals, respectively,
   a difference detection circuit for calculating a difference between said first and said second memorized argument signals to produce a difference signal representative of said difference, and
   a dividing circuit for dividing said difference signal by a difference between said first and said second constant values to produce said offset signal.

* * * * *